United States Patent [19]
Vanstone et al.

[11] Patent Number: 6,141,420
[45] Date of Patent: *Oct. 31, 2000

[54] ELLIPTIC CURVE ENCRYPTION SYSTEMS

[75] Inventors: Scott A. Vanstone; Ronald C. Mullin, both of Waterloo; Gordon B. Agnew, Campbellville, all of Canada

[73] Assignee: Certicom Corp., Mississauga, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/790,987

[22] Filed: Jan. 29, 1997

Related U.S. Application Data

[63] Continuation of application No. PCT/CA95/00452, Jul. 31, 1995, which is a continuation-in-part of application No. 08/282,263, Jul. 29, 1994, abandoned.

[51] Int. Cl.$^7$ .............................. H04L 9/30; H04L 9/28; H04L 9/00
[52] U.S. Cl. .................................. 380/30; 380/9; 380/28; 380/49; 708/491; 708/492
[58] Field of Search ................................. 380/28, 30, 44, 380/46, 49, 50, 9; 708/200, 491, 492

[56] References Cited

U.S. PATENT DOCUMENTS

| | | |
|---|---|---|
| 4,745,568 | 5/1988 | Onyszchuk et al. . |
| 4,748,668 | 5/1988 | Shamir . |
| 4,890,323 | 12/1989 | Beker . |
| 4,989,171 | 1/1991 | Hollmann . |
| 5,146,500 | 9/1992 | Maurer ..................................... 380/30 |
| 5,150,411 | 9/1992 | Maurer ..................................... 380/30 |
| 5,159,632 | 10/1992 | Crandall ................................... 380/28 |
| 5,218,637 | 6/1993 | Angebaud . |
| 5,271,061 | 12/1993 | Crandall ................................... 380/28 |
| 5,272,755 | 12/1993 | Miyaji et al. ............................. 380/30 |
| 5,351,297 | 9/1994 | Miyaji et al. ............................. 380/28 |
| 5,442,707 | 8/1995 | Miyaji et al. ............................. 380/30 |
| 5,463,690 | 10/1995 | Crandall ................................... 380/30 |
| 5,497,423 | 3/1996 | Miyaji ....................................... 380/30 |
| 5,627,893 | 5/1997 | Demytko ................................... 380/30 |

FOREIGN PATENT DOCUMENTS

| | | |
|---|---|---|
| 0 588 339 A2 | 3/1994 | European Pat. Off. . |
| 2 536 928 | 6/1984 | France . |
| WO 91/16691 | 10/1991 | WIPO . |

OTHER PUBLICATIONS

8092 IEEE Transactions on Computers C–34 (1985) Aug., No. 8, New York, USA, "VLSI Architectures for Computing Multiplications and Inverses in GF (2m)"—Charles C. Wang et al., pp. 709, 711, 713, 715, 717.

Miyaji, "Elliptic Curves Suitable for Cryptosystems", IEICE Transactions on Fundamentals of Electronics, Communications and Computer Sciences, vol. E77–A, No. 1 (Jan. 1, 1994), pp. 98–104.

Schnorr, "Efficient Signature Generation by Smart Cards", Journal of Cryptology, vol. 4, No. 3 (Jan. 1, 1991), pp. 161–174.

Koyama et al., "Elliptic Curve Cryptosystems and Their Applications", IEICE Transactions on Information and Systems, vol. E75–D, No. 1 (Jan. 1, 1992), pp. 50–57.

Waleffe et al., "CORSAIR: A Smart Card for Public Key Cryptosystems", Advances in Cryptology—Proceedings of Crypto, Santa Barbara, Aug. 11–15, 1990, No. Conf. 10 (Jan. 1, 1990), pp. 502–513.

(List continued on next page.)

Primary Examiner—Bernarr Earl Gregory
Attorney, Agent, or Firm—Pillsbury Madison & Sutro LLP

[57] ABSTRACT

An elliptic curve encryption system represents coordinates of a point on the curve as a vector of binary digits in a normal basis representation in $F_{2^m}$. A key is generated from multiple additions of one or more points in a finite field. Inverses of values are computed using a finite field multiplier and successive exponentiations. A key is represented as the coordinates of a point on the curve and key transfer may be accomplished with the transmission of only one coordinate and identifying information of the second. An encryption protocol using one of the coordinates and a further function of that coordinate is also described.

52 Claims, 5 Drawing Sheets

OTHER PUBLICATIONS

Koblitz, "Elliptic Curve Cryptosystems", Mathematics of Computation, vol. 48, No. 177 (Jan. 1987), pp. 203–209.

Menezes, Alfred, "Elliptic Curve Cryptosystems", a thesis presented to the Univ. of Waterloo (1992), pp. 1–93.

Miller, Victor C., "Use of Elliptic Curves in Cryptography", Crypto '85, LNCS 218, Springer Vertag (1985), pp. 417–426.

Menezes et al., "The implementation of Elliptic Curve Cryptosystems", Advances in Cryptology–Auscrypt '90, vol. 453 of "Lecture Notes in Computer Science", pp. 1–12 Sydney, Australia, Jan. 8–11, 1990.

ELLIPTIC CURVE ENCRYPTION SYSTEMS

This is a continuation of PCT/CA95/00452, filed on Jul. 31, 1995, which is a continuation-in-part of Ser. No. 08/282,263, filed on Jul. 29, 1994, now abandoned.

FIELD OF THE INVENTION

The present invention relates to public key cryptography.

The increasing use and sophistication of data transmission in such fields as telecommunications, networking, cellular communication, wireless communications, "smart card" applications, audio-visual and video communications has led to an increasing need for systems that permit data encryption, authentication and verification.

It is well known that data can be encrypted by utilizing a pair of keys, one of which is public and one of which is private. The keys are mathematically related such that data encrypted with the public key may only be decrypted with the private key and conversely, data encrypted with the private key can only be decrypted with the public key. In this way, the public key of a recipient may be made available so that data intended for that recipient may be encrypted with the public key and only decrypted by the recipient's private key, or conversely, encrypted data sent can be verified as authentic when decrypted with the sender's public key.

The most well known and accepted public key cryptosystems are those based on integer factorization and discrete logarithms in finite groups. In particular, the RSA system for modulus n=p·q where p and q are primes, the Diffie-Hellman key exchange and the ElGamal protocol in $Z_p$, (p a prime) have been implemented worldwide.

The RSA encryption scheme, where two primes p and q are multiplied to provide a modulus n, is based on the integer factorization problem. The public key e and private key d are related such that their product e·d equals 1(mod $\phi$) where $\phi$=(p−1)(q−1). A message M is encrypted by exponentiating it with the private key e to the modulus n, [C=$M^e$(mod $^-$n)] and decrypted by exponentiating with the public key mod n [M=$C^d$(mod n)]. This technique requires the transmission of the modulus n and the public key and the security of the system is based on the difficulty of factoring a large number that has no relatively small factors. Accordingly both p and q must be relatively large primes.

One disadvantage of this system is that p and q must be relatively large (at least 512 bits) to attain an adequate level of security. With the RSA protocol this results in a 1024 bit modulus and a 512 bit public key which require significant bandwidth and storage capabilities. For this reason researchers have looked for public key schemes which reduce the size of the public key. Moreover, recent advances in analytical techniques and associated algorithms have rendered the RSA encryption scheme potentially vulnerable and accordingly raised concerns about the security of such schemes. This implies that larger primes, and therefore a larger modulus, need to be employed in order to maintain an acceptable level of security. This in turn increases the bandwidth and storage requirements for the implementation of such a scheme.

Since the introduction of the concept of public key cryptography by Diffie and Hellman in 1976, the potential for the use of the discrete logarithm problem in public key cryptosystems has been recognized. In 1985, ElGamal described an explicit methodology for using this problem to implement a fully functional public key cryptosystem, including digital signatures. This methodology has been refined and incorporated with various protocols to meet a variety of applications, and one of its extensions forms the basis for a proposed U.S. digital signature standard (DSS). Although the discrete logarithm problem, as first employed by Diffie and Hellman in their public key exchange algorithm, referred explicitly to the problem of finding logarithms with respect to a primitive element in the multiplicative group of the field of integers modulo a prime p, this idea can be extended to arbitrary groups (with the difficulty of the problem apparently varying with the representation of the group).

The discrete logarithm problem assumes that G is a finite group, and a and b are elements of C. Then the discrete logarithm problem for G is to determine a value x (when it exists) such that $a^x$=b. The value for x is called a logarithm of b to the base of a, and is denoted by $\log_a b$.

The difficulty of determining this quantity depends on the representation of G. For example, if the abstract cyclic group of order m is represented in the form of the integers modulo m, then the solution to the discrete logarithm problem reduces to the extended Euclidean algorithm, which is relatively easy to solve. However, the problem is made much more difficult if m+1 is a prime, and the group is represented in the form of the multiplicative group of the finite field $F_{m+1}$. This is because the computations must be performed according to the special calculations required for operating in finite fields.

It is also known that by using computations in a finite field whose members lie on an elliptic curve, that is by defining a group structure G on the solutions of $y^2+xy=x^3+ax^2+b$ over a finite field, the problem is again made much more difficult because of the attributes of elliptic curves. Therefore, it is possible to attain an increased level of security for a given size of key. Alternatively a reduced key may be used to maintain a required degree of security.

The inherent security provided by the use of elliptic curves is derived from the characteristic that an addition of two points on the curve can be defined as a further point that itself lies on the curve. Likewise the result of the addition of a point to itself will result in another point on the curve. Therefore, by selecting a starting point on the curve and multiplying it by an integer, a new point is obtained that lies on the curve. This means that where P=(x,y) is a point on an elliptic curve over a finite field [E($F_{q^e}$)], with x and y each represented by a vector of n elements then, for any other point R∈<P> (the subgroup generated by P), dP=R. To attack such a scheme, the task is to determine an efficient method to find an integer d, $0 \leq d \leq$(order of P)−1 such that dP=R. To break such a scheme, the best algorithms known to date have running times no better than $O(\sqrt{p})$, where p is the largest prime dividing the order of the curve (the number of points on the curve).

Thus, in a cryptographic system where the integer d remains secret, the difficulty of determining d can be exploited.

An ElGamal protocol of key exchange based on elliptic curves takes advantage of this characteristic in its definition of private and public keys. Such an ElGamal protocol operates as follows:

1. In order to set up the protocol, where a message is to be sent from A to B, an elliptic curve must be selected and a point P=(x,y), known as the generating point, must be selected.

Encryption

2. The receiver, B, then picks a random integer d as his private key. He then computes dP, which is another point on the curve, which becomes his public key that is made available to the sender and the public. Although the sender knows the value dP, due to the characteristic of elliptic curves noted above, he has great difficulty determining the private key d.

3. The sender A, chooses another random integer k, the session seed, and computes another point on the curve, kP which serves as a public session key. This also exploits the characteristic of elliptic curves mentioned above.

4. The sender, A, then retrieves the public key dP of receiver B and computes kdP, another point on the curve, which serves as the shared encryption key for that session.

5. The sender, A, then encrypts the message M with the encryption key to obtain the ciphertext C.

6. The sender then sends the public session key kP and the ciphertext C to the receiver B.

Decryption

7. The receiver, B, determines the encryption key kdP by multiplying his private key d by kP.

8. The receiver, B, can then retrieve the message M by decrypting the ciphertext C with the encryption key kdP. During the entire exchange, the private key d and the seed key k remain secret so that even if an interloper intercepts the session key kP he cannot derive the encryption key kdP from B's public key dP.

Elliptic curve cryptosystems can thus be implemented employing public and private keys and using the ElGamal protocol.

The elliptic curve cryptography method has a number of benefits. First, each person can define his own elliptic curve for encryption and decryption, which gives rise to increased security. If the private key security is compromised, the elliptic curve can be easily redefined and new public and private keys can be generated to return to a secure system. In addition, to decrypt data encoded with the method, only the parameters for the elliptic curve and the session key need be transmitted.

One of the drawbacks of other public key systems is the large bandwidth and storage requirements for the public keys. The implementation of a public key system using elliptic curves reduces the bandwidth and storage requirements of the public key system because the parameters can be stored in fewer bits. Until now, however, such a scheme was considered impractical due to the computational difficulties involved and the requirement for high speed calculations. The computation of kP, dP and kdP used in a key exchange protocol require complex calculations due to the mathematics involved in adding points in elliptic curve fields.

Computations on an elliptic curve are performed according to a well known set of relationships. If K defines any field, then an equation of the form $y^2 + a_1 xy + a_3 y = x^3 + a_2 x^2 + a_4 x + a_6$, where each of the coefficients $a_i$ lie in K, defines an elliptic curve over K. If E is the set of points on this curve, then an abelian group can be defined on the set $E \cup \{O\}$, where O is a special element not occurring in E. O acts as the zero element of the group. If $P=(x,y)$, then $-P=(x,-y)$ in the case of an odd characteristic, and for two points P and Q on the curve where $Q \neq \pm P$, the sum P+Q is the third point on the curve where the line joining P and Q again meets the curve. If P=Q, then the tangent line is used. As in any abelian group, we use the notation nP to denote P added to itself n times if n is positive, and −P added to itself |n| times if n is negative, and 0P=O.

If $F_q$ is a finite field, then elliptic curves over $F_q$ can be divided into two classes, namely supersingular and non-supersingular curves. If $F_q$ is of characteristic 2, i.e. $g=2^M$, then the classes are defined as follows.

i) The set of all solutions to the equation $y^2 + ay = x^3 + bx + c$ where $a,b,c \in F_q$, $a \neq 0$, together with a special point called the point at infinity O is a supersingular curve over $F_q$.

ii) The set of all solutions to the equation $y^2 + xy = x^3 + ax^2 + b$ where $a,b \in F_q$, $b \neq 0$, together with a special point called the point at infinity O is a nonsupersingular curve over $F_q$.

By defining an appropriate addition on these points, we obtain an additive abelian group. The addition of two points $P(x_1, y_1)$ and $Q(x_2, y_2)$ for the supersingular elliptic curve E with $y^2 + ay = x^3 + bx + c$ is given by the following:

If $P=(x_2, y_2) \in E$; then define
$-P=(x_1, y_1+a)$, P+O=O+P=P for all $P \in E$.

If $Q=(x_2, y_2) \in E$ and $Q \neq -P$, then the point representing the sum of P+Q, is denoted $(x_3, y_3)$, where $$x_3 = \left\{ \left( \frac{y_1 \oplus y_2}{x_1 \oplus x_2} \right)^2 \oplus x_1 \oplus x_2 \quad (P \neq Q) \text{ or} \right.$$

$$x_3 = \left\{ \frac{x_1^4 \oplus b^2}{a^2} \quad (P = Q) \text{ and} \right.$$

$$y_3 = \left\{ \left( \frac{y_1 \oplus y_2}{x_1 \oplus x_2} \right) (x_1 \oplus x_3) \oplus y_1 \oplus a \quad (P \neq Q) \text{ or} \right.$$

$$y_3 = \left\{ \left( \frac{x_1^2 \oplus b}{a} \right) (x_1 \oplus x_3) \oplus y_1 \oplus a \quad (P = Q) \right.$$

The addition of two points $P(x_1, y_1)$ and $Q(x_2, y_2)$ for the nonsupersingular elliptic curve $y^2 + xy = x^3 + ax^2 + b$ is given by the following:

If $P=(x_1, y_1) \in E$ then define $-P=(x_1, y_1+x_1)$. For all $P \in E$, O+P=P+O=P. If $Q=(x_2, y_2) \in E$ and $Q \neq -P$, then P+Q is a point $(x_3, y_3)$ where $$x_3 = \left\{ \left( \frac{y_1 \oplus y_2}{x_1 \oplus x_2} \right)^2 \oplus \frac{y_1 \oplus y_2}{x_1 \oplus x_2} \oplus x_1 \oplus x_2 \oplus a \quad (P \neq Q) \text{ or} \right.$$

$$x_3 = \left\{ x_1^2 \oplus \frac{b}{x_1^2} \quad (P = Q) \text{ and} \right.$$

$$y_3 = \left\{ \left( \frac{y_1 \oplus y_2}{x_1 \oplus x_2} \right) (x_1 \oplus x_3) \oplus x_3 \oplus y_1 \quad (P \neq Q) \text{ or} \right.$$

$$y_3 = \left\{ x_1^2 \oplus \left( x_1 \oplus \frac{y_1}{x_1} \right) x_3 \oplus x_3 \quad (P = Q) \right.$$

Accordingly it can be seen that computing the sum of two points on E requires several multiplications, additions, and inverses in the underlying field $F_q$. In turn, each of these operations requires a sequence of elementary bit operations.

When implementing an ElGamal or Diffie-Hellman scheme with elliptic curves, one is required to compute kP=P+P+ ... +P (P added k times) where k is a positive integer and $P \in E$. This requires the computation of $(x_3, y_3)$ to be computed k−1 times. Even if alternative techniques such as "double and add" are utilised, it is still necessary to compute the addition of two points several times, each of which requires multiplications, additions and inverses in the underlying finite field. For large values of k which are typically necessary in cryptographic applications, this has previously been considered impractical for data communication.

It is an object of the present invention to provide a method of encryption utilizing elliptic curves that facilitates the computation of additions of points while providing an adequate level of security in an efficient and effective manner.

The applicants have developed a method using a modified version of the Diffie-Hellman and ElGamal protocols defined in the group associated with the points on an elliptic curve over a finite field. The method involves formulating the elliptic curve calculations so as to make elliptic curve cryptography efficient, practical and viable, and preferably employs the use of finite field processor such as the Computational Method and Apparatus for Finite Field Multiplication as disclosed in U.S. Pat. No. 4,745,568. The preferred method exploits the strengths of such a processor with its computational abilities in finite fields. The inventive method structures the elliptic curve calculations as finite field multiplication and exponentiation over the field $F_{2^m}$. In the preferred method, a normal basis representation of the finite field is selected and the calculations which can readily be performed on a finite field processor.

The inventors have recognized that the computations necessary to implement the elliptic curve calculations can be performed efficiently where a finite field of characteristic 2 is chosen.

When computing in a field of characteristic 2, i.e. $F_{2^m}$, squaring is a linear operation, i.e. $(A+B)^2$ is $A^2+B^2$. By adapting appropriate representations, the computation of the squared terms required in the addition of two points is greatly simplified. In particular, if a normal basis representation is chosen, squaring can be achieved through a cyclic shift of the binary vector representing the field element to be squared.

Moreover, computing inverses in $F_{2^m}$ can be implemented with simple shift and XOR operations by selection of an appropriate representation. In some implementations, the computation of an inverse can be arranged to utilize multiple squaring operations and thereby improve the efficiency of the computation.

When such computations are performed using a normal basis representation of the finite field, the inventors have also recognized that the elliptic curve calculations are further simplified with the computations presented in this form, the applicants have realized that specialized semiconductor devices can be fabricated to perform the calculations. With the calculations presented in such a form, additions in the field $F_{2^m}$ can be efficiently performed in one clock cycle utilizing a simple XOR operation.

Multiplications can be performed very efficiently in only n clock cycles where n is the number of bits being multiplied. Furthermore, squaring can be efficiently performed in 1 clock cycle as a cyclic shift of the bit register. Finally, inverses can easily be computed, requiring approximately $\log_2 n$ multiplications rather than the approximately 2n multiplications required in other arithmetic systems.

The inventors have also recognized that the bandwidth and storage requirements of a cryptographic system utilizing elliptic curves can be significantly reduced where for any point P(x,y) on the curve, only the x coordinate and one bit of the y coordinate need be stored and transmitted, since the one bit will indicate which of the two possible solutions is the second coordinate.

The inventors have also recognized when using the ElGamal protocol that messages need not be points on the curve if the protocol is modified such that the message M is considered as a pair of field elements $M_1 M_2$ and each is operated on by the coordinates $(x_1 y)$ of the session encryption key kdP in a predetermined manner to produce new field elements $C_1 C_2$ that represent the ciphertext C. The receiver can then extract the message $M=(m_1,m_2)$ by applying the inverse transformation of the predetermined manner. Although this may require an inverse operation in the field, they may be performed efficiently in the field $F_{2^{155}}$, and in particular when operating with the processor noted above.

To assist in the appreciation of the implementation of the present invention, it is believed that a review of the underlying principles of finite field operations is appropriate. The finite field $F_2$ is the number system in which the only elements are the binary numbers 0 and 1 and in which the rules of addition and multiplication are the following:

0+0=1+1=0
0+1=1+0=1
0×0=1×0=0×1=0
1×1=1

These rules are commonly called modulo-2 arithmetic. All additions specified in logic expressions or by adders in this application are performed modulo-2 as an XOR operation. Furthermore, multiplication is implemented with logical AND gates.

The finite field $F_{2^m}$, where m is an integer greater than 1, is the number system in which there are $2^m$ elements and in which the rules of addition and multiplication correspond to arithmetic modulo an irreducible polynomial of degree m with coefficients in $F_2$. Although in an abstract sense there is for each m only one field $F_{2^m}$, the complexity of the logic required to perform operations in $F_{2^m}$ depends strongly on the particular way in which the field elements are represented. These operations may be performed using processors implemented in either hardware or software with dedicated hardware processors generally considered faster.

The conventional approach to operations performed in $F_{2^m}$ is described in such papers as T. Bartee and D. Schneider, "Computation with Finite Fields", Information and Control, Vol. 6, pp. 79–98, 1963. In this conventional approach, one first chooses a polynomial P(X) of degree m which is irreducible over $F_{2^m}$, that is, P(X) has binary coefficients but cannot be factored into a product of polynomials with binary coefficients each of whose degree is less than m. An element A in $F_{2^m}$ is then defined to be a root of P(X), that is, to satisfy P(A)=0. The fact that P(X) is irreducible guarantees that the m elements $A^0=1$, A, $A^2$, ... $A^{m-1}$ of $F_{2^m}$ are linearly independent over $F_2$.

For the purposes of illustration, the example of $F_{2^3}$ will be used with the choice of $P(X)=X^3+X+1$ for the irreducible polynomial of degree 3. The next step is to define A as an element of $F_{2^3}$ such that $A^3+A+1=0$. The following assignment of unit vectors is then made:

$A^0=1=[1,0,0]$
$A^1=[0,1,0]$
$A^2=[0,0,1]$

An arbitrary element B of $F_2$, is now represented by the binary vector $[b_2, b_1, b_0]$ with the meaning that $B=[b_2, b_1, b_0]=b_2 A^2+b_1 A+b_0$.

If we represent a second element $C=[c_2, c_1, c_0]$, it follows that $B+C=[b_2 \oplus c_2, b_1 \oplus c_1, b_0 \oplus c_0]$.

Thus, in the conventional approach, addition in $F_{2^3}$ is easily performed by logic that merely forms the modulo-2 sum of the two vectors representing the elements to be summed component-by-component. Multiplication is, however, considerably more complex to implement.

Continuing the example, from the irreducible polynomial it can be seen that $A^3=A+1$ and $A^4=A^2+A$ where use has been made of the fact that $-1=+1$ in F(2). In hardware, multiplication can be simplified by taking advantage of the special feature of a finite field $F_{2^m}$ that there always exists a so-called normal basis for the finite field. That is, one can always find a field element N such that N, $N^2$, $N^4$ ... $N^{2^{m-1}}$ are a basis for $F_{2^m}$. Every field element B can be uniquely written as $B=b_{m-1}N^{2^{m-1}}+ \ldots +b_2 N^4+b_1 N^2+b_0$ $N=[b_{m-1}, \ldots, b_2, b_1, b_0]$ where $b_0, b_1, b_2, \ldots b_{m-1}$ are binary digits.

For example, in the finite field $F_{2^3}$, if we let $N=[1,1,0]$

| Element Field | Normal Basis Representation | Normal basis Vector |
|---|---|---|
| [0,0,0] | — | [0,0,0] |
| [1,0,0] | $N^2 + N^4$ | [1,1,1] |
| [0,1,0] | $N + N^2 + N^4$ | [0,1,1] |
| [0,0,1] | $N + N^2$ | [1,0,1] |
| [1,1,0] | $N$ | [1,0,0] |
| [1,0,1] | $N + N^4$ | [0,1,0] |
| [0,1,1] | $N$ | [1,1,0] |
| [1,1,1] | $N^2$ | [0,0,1] |

Then, if $B=[b_{m-1}, \ldots, b_2, b_1, b_0]$ and $C=[c_{m-1}, \ldots, c_2, c_1, c_0]$ are any two elements of $F_{2^m}$ in normal basis representation, then the product $D=B \times C=[d_{m-1} \ldots, d_2, d_1, d_0]$ has the property that the same logic circuitry which when applied to the components or binary digits of the vectors representing B and C produces $d_{m-1}$ will sequentially produce the remaining components $d_{m-2}, \ldots, d_2, d_1, d_0$ of the product when applied to the components of the successive shifts of the vectors representing B and C.

As illustrated in U.S. Pat. No. 4,745,568 for Computational Method and Apparatus for Finite Field Multiplication, multiplication may be implemented by storing bit vectors B and C in respective shift registers and establishing connections to respective accumulating cells such that a grouped term of each of the expressions $d_i$ is generated in respective ones of m accumulating cells. By rotating the bit vectors B and C in the shift registers and by rotating the contents of the accumulating cells, each grouped term of a respective binary digit $d_i$ is accumulated in successive cells. Thus all of the binary digits of the product vector are generated simultaneously in the accumulating cells after one complete rotation of the bit vectors B and C.

One attribute of operating such a processor is that in the field $F_{2^m}$, is that squaring is a linear operation in the sense that for every pair of elements B and C in $F_{2^m}$, $(B+C)^2=B^2+C^2$. It is the case for every element B of $F_{2^m}$ that $B^{2^M}=B$.

In particular in a normal basis representation, squaring an element involves a cyclic shift of the vectors representation of the element, i.e. if $B=[b_{m-1}, \ldots, b_2, b_1, b_0]$ then $B^2=[b_{m-2}, \ldots, b_2, b_1, b_0, b_{m-1}]$.

Thus when using the processor exemplified above, squaring may be achieved in one cycle. Moreover, this general characteristic of $F_{2^m}$, where squaring is a linear operation, may be exploited in other implementations, such as software, where a normal basis representation is not used.

As noted above, the inventors have taken advantage of the efficiency of the mathematical operations in $F_{2^m}$ in the implementation of an elliptic curve encryption scheme. The applicants have developed a method of formulating the elliptic curve calculations so as to make elliptic curve cryptography efficient, practical and viable. The preferred method employs the use of a finite field processor such as the Computational Method and Apparatus for Finite Field Multiplication as disclosed in U.S. Pat. No. 4,745,568. The method couples the attractive cryptographic characteristics of elliptic curves with the strengths of the field processor through its computational abilities in finite field $F_{2^m}$. The inventive method structures the elliptic curve calculations as operations, such as multiplication and exponentiation, over the field where $F_{2^m}$, which can readily be calculated on a finite field processor.

BRIEF DESCRIPTION OF THE DRAWINGS

An embodiment of the invention will now be described by way of example only with reference to the accompanying drawings in which.

An embodiment of the invention will first be described utilising an ElGamal key exchange protocol and a Galois field $F_{2^{155}}$ to explain the underlying principles. Further refinements will then be described.

SYSTEM COMPONENTS

Figure 1:
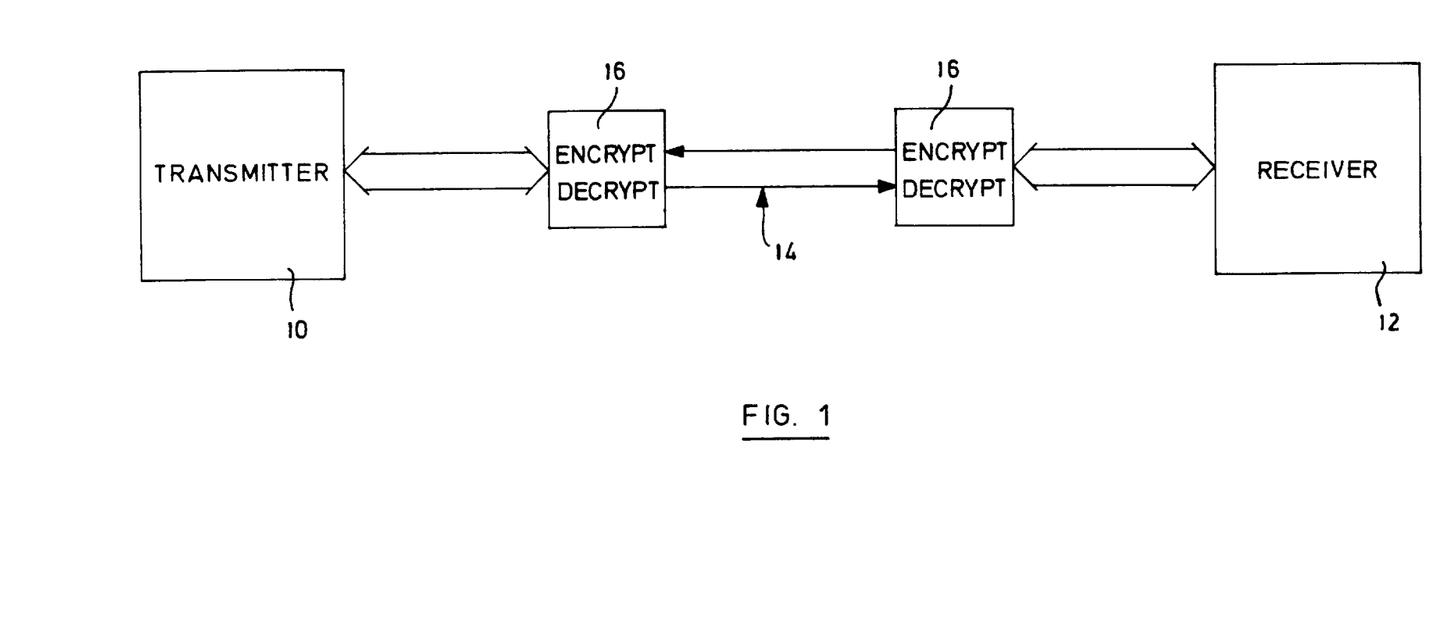
FIG. 1 is a diagram of the transmission of an encrypted message from one location to another.

Referring therefore to FIG. 1, a message M is to be transferred from a transmitter 10 to a receiver 12 through a communication channel 14. Each of the transmitters 10 and receiver 12 has an encryption/decryption module 16 associated therewith to implement a key exchange protocol and an encryption/decryption algorithm.

Figure 2:
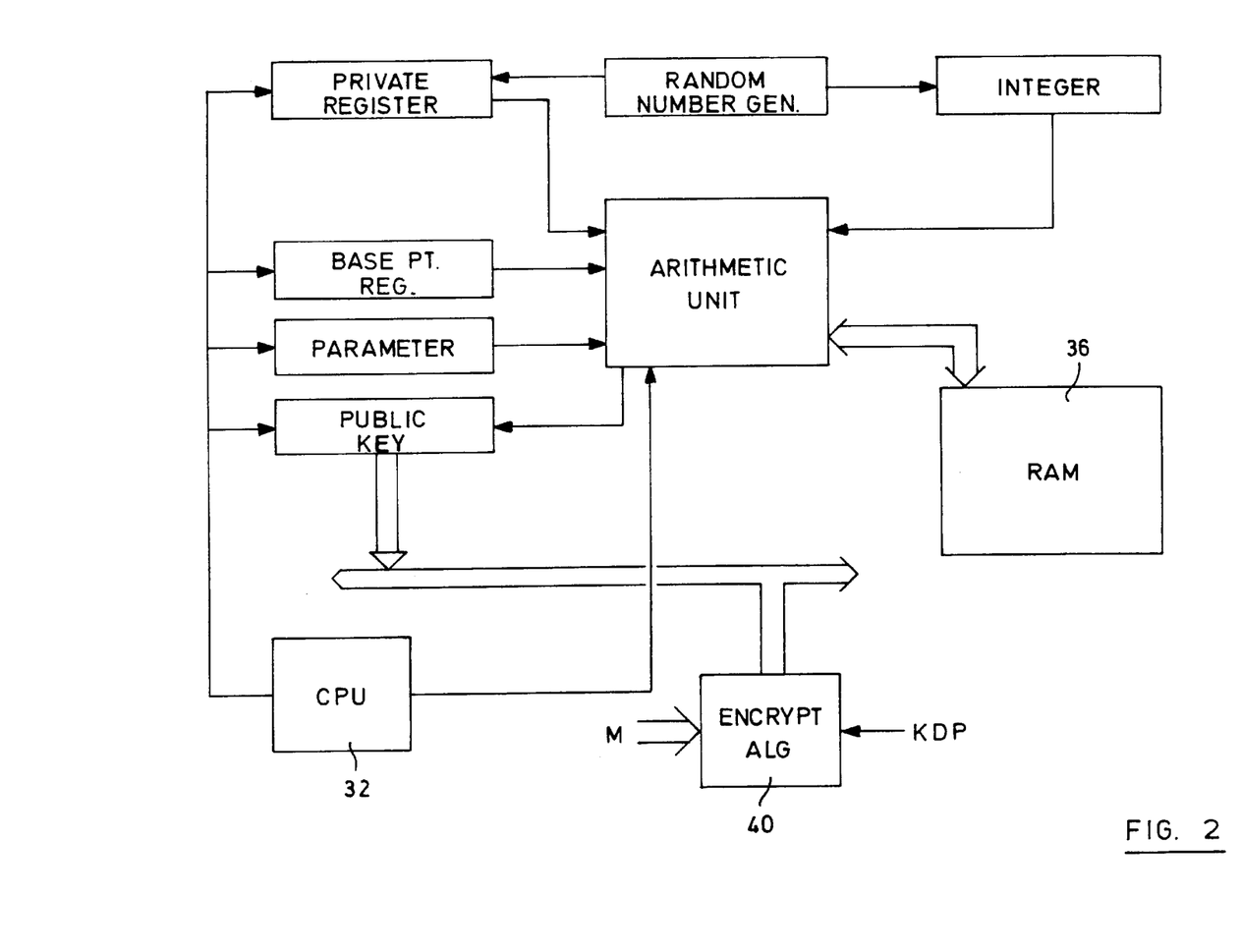
FIG. 2 is a diagram of an encryption module used with the communication system of FIG. 1.

The module 16 is shown schematically in FIG. 2 and includes an arithmetic unit 20 to perform the computations in the key exchange and generation. A private key register 22 contains a private key, d, generated as a 155 bit data string from a random number generator 24, and used to generate a public key stored in a public key register 26. A base point register 28 contains the coordinates of a base point P that lies in the elliptic curve selected with each coordinate (x, y), represented as a 155 bit data string. Each of the data strings is a vector of binary digits with each digit being the coefficient of an element of the finite field in the normal basis representation of the coordinate.

The elliptic curve selected will have the general form $y^2+xy=x^3+ax^2+b$ and the parameters of that curve, namely the coefficients a and b are stored in a parameter register 30. The contents of registers 22, 24, 26, 28, 30 may be transferred to the arithmetic unit 20 under control of a C.P.U. 32 as required.

The contents of the public key register 26 are also available to the communication channel 14 upon a suitable request being received. In the simplest implementation, each encryption module 16 in a common security zone will operate with the same curve and base point so that the contents of registers 28 and 30 need not be accessible. If further sophistication is required, however, each module 16 may select its own curve and base point in which case the contents of registers 28, 30 have to be accessible to the channel 14.

The module 16 also contains an integer register 34 that receives an integer k, the session seed, from the generator 24 for use in encryption and key exchange. The module 16 has a random access memory (RAM) 36 that is used as a temporary store as required during computations.

The encryption of the message M with an encryption key kdP derived from the public key dP and session seed integer k is performed in an encryption unit 40 which implements a selected encryption algorithm. A simple yet effective algorithm is provided by an XOR function which XOR's the message m with the 310 bits of the encryption key kdP. Alternative implementations such as the DES encryption algorithm could of course be used.

An alternative encryption protocol treats the message m as pairs of coordinates $m_1, m_2$, each of 155 bit lengths in the case of $F_{2^{155}}$, and XOR's the message $m_1, m_2$ with the coordinates of the session key kdP to provide a pair of bit strings $(m_1 \oplus x_0)(m_2 \oplus y_0)$. For further security a pair of field elements $z_1 z_2$ are also formed from the coordinates $(x_0 y_0)$ of kdP.

In one embodiment, the elements $z_1 z_2$ are formed from the concatenation of part of $x_0$ with part of $y_0$, for example, $z_1 = x_{01} \| y_{02}$ and $z_2 = x_{02} \| y_{01}$
where $x_{01}$ is the first half of the bit string of $x_0$
$x_{02}$ is the second half of the bit string of $x_0$
$y_{01}$ is the first half of the bit string of $y_0$
$y_{02}$ is the second half of the bit string of $y_0$ The first elements $z_1$ and $Z_2$ when treated as field elements are then multiplied with respective bit strings $(m_1 \oplus x_0)$ and $(m_2 \oplus y_0)$ to provide bit strings $c_1 c_2$ of ciphertext c.

i.e. $c_1 = z_1 (m_1 \oplus x_0)$
$C_2 = z_3 (m_2 \oplus y_0)$

In a preferred implementation of the encryption protocol, a function of $x_0$ is used in place of $y_0$ in the above embodiment. For example the function $x_0^3$ is used as the second 155 bit string so that $$c_1 = z_1(m_1 \oplus x_0)$$
$$c_2 = z_2(m_2 \oplus x_0^3)$$

and $$z_1 = x_{01} \| x_{02}^2$$
$$z_1 = x_{02} \| x_{01}^3$$

where $x_{01}^3$ is the first half of $X_0^3$
$z_{02}^3$ is the second half of $x_0^3$ This protocol is also applicable to implementation of elliptic curve encryption in a field other than $F_{2^m}$, for example $Z_p$ or in general $F_{p^m}$.

Where $z_p$ is used it may be necessary to adjust the values of $x_0$ and $y_0$ or $x_0^3$ to avoid overfow in the multiplication with $z_1$ and $z_2$. Conventionally this may be done by setting the most significant bit $x_0$ and $F_{p^m}$ or $y_0$ to zero.

Key Generation, Exchange and Encryption

In order for the transmitter 10 to send the message M to the receiver 12, the receivers public key is retrieved by the transmitter 10. The public key is obtained by the receiver 12 computing the product of the secret key d and base point P in the arithmetic unit 20 as will be described more fully below. The product dP represents a point on the selected curve and serves as the public key. The public key dP is stored as two 155 bit data strings in the public key register 26.

Upon retrieval of the public key dP by the transmitter 10, it is stored in the RAM 36. It will be appreciated that even though the base point P is known and publicly available, the attributes of the elliptic curve inhibit the extraction of the secret key d.

The transmitter 10 uses the arithmetic unit 20 to compute the product of the session seed k and the public key dP and stores the result, kdP, in the RAM 36 for use in the encryption algorithm. The result kdP is a further point on the selected curve, again represented by two 155 bit data strings or vectors, and serves as an encryption key.

The transmitter 10 also computes the product of the session seed k with the base point P to provide a new point kP, the session public key, which is stored in the RAM 36.

The transmitter 10 has now the public key dP of the receiver 12, a session public key kP and an encryption key kdP and may use these to send an encrypted message. The transmitter 10 encrypts the message M with the encryption key kdP in the encryption unit 40 implementing the selected encryption protocols discussed above to provide an encrypted message C. The ciphertext C is transmitted together with the value kP to the encryption module 16 associated with receiver 12.

The receiver 12 utilises the session public key kP with its private key d to compute the encryption key kdP in the arithmetic unit 20 and then decrypt the ciphertext C in the encryption unit 40 to retrieve the message M.

During this exchange, the secret key d and the session seed k remain secret and secure. Although P, kP and dP are known, the encryption key kdP cannot be computed due to the difficulty in obtaining either d or k.

The efficacy of the encryption depends upon the efficient computation of the values kP, dP and kdP by the arithmetic unit 20. Each computation requires the repetitive addition of two points on the curve which in turn requires the computation of squares and inverses in $F_{2^m}$.

Operation of the Arithmetic Unit

Figure 3:
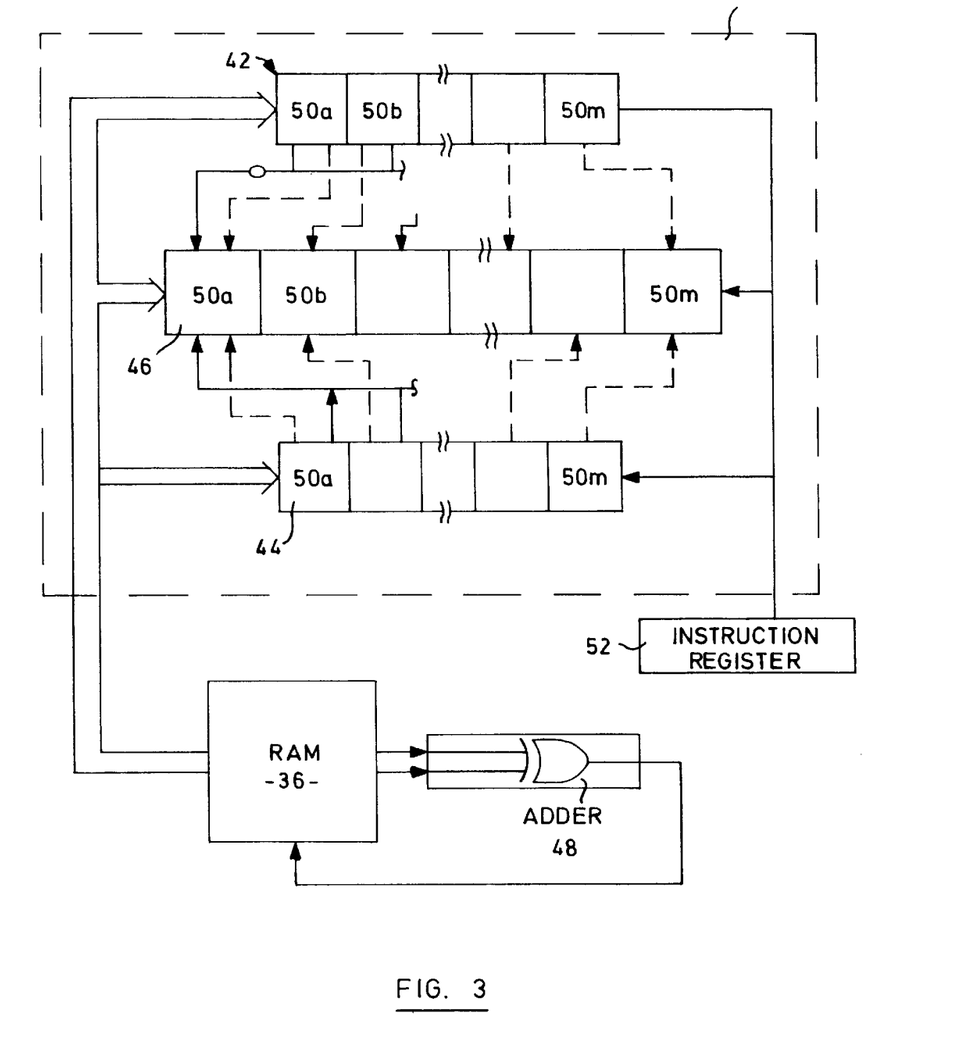
FIG. 3 is a diagram of a finite field processor used in the encryption and decryption module of FIG. 2.

The operation of the arithmetic unit 20 is shown schematically in FIG. 3. The unit 20 includes a multiplier 48 having a pair of cyclic shift registers 42, 44 and an accumulating register 46. Each of the registers 42, 44, 46 contain M cells 50a, 50b ... 50m, in this example 155, to receive the m elements of a normal basis representation of one of the coordinates of e.g. x, of P. As fully explained in U.S. Pat. No. 4,745,568, the cells 50 of registers 42, 44 are connected to the corresponding cells 50 of accumulating register 46 such a way that a respective grouped term is generated in each cell of register 46. The registers 42,44,46 are also directly interconnected in a bit wise fashion to allow fast transfers of data between the registers.

The movement of data through the registers is controlled by a control register 52 that can execute the instruction set shown in the table below:

TABLE 1

| INSTRUCTION SET | | |
| --- | --- | --- |
| Operation | Size | Clock Cycles |
| Field Multiplication MULT | 155 bit blocks | 156 |
| Calculation of Inverse INVERSE | 24 multiplications | approx. 3800 |
| I/O | 5-32 bit transfers per 10 clock cycles | 10 |
| WRITE(A,B or C) READ(A,B or C) | read/write to registers | 2 clock cycles per transfer |
| Elementary Register | 155 bit parallel operation | |
| (idle) NOP | | |
| Rotate (A,B or C) | | |
| Copy (A <- B) (A <- C) (A <- B) (B <- C) | | |
| SWAP (A <-> B) | | |
| CLEAR (A,B or C) | | |

TABLE 1-continued

INSTRUCTION SET

| Operation | Size | Clock Cycles |
|---|---|---|
| SET (A,B or C) | | |
| ADD (A ● B) | | |
| ACCUMULATE | | |

The unit 20 includes an adder 54 to receive data from the registers 42,44,46 and RAM 36. The adder 54 is an XOR function and its output is a data stream that may be stored in RAM 36 or one of the registers 42, 44. Although shown as a serial device, it will be appreciated that it may be implemented as a parallel device to improve computing time. similarly the registers 42,44,46 may be parallel loaded. Each of the registers 42,44,46, is a 155 bit register and is addressed by a 32 bit data bus to allow 32 bit data transfer in 2 clock cycles and the entire loading in 5 operations.

The subroutines used in the computation will now be described.

a) Multiplication

The cyclic shift of the elements through the registers 42, 44 m times with a corresponding shift of the accumulating register 46 accumulates successive group terms in respective accumulating cells and a complete rotation of the elements in the registers 42, 44, produces the elements of the product in the accumulating register 46.

b) Squaring

By operating in $F_{2^m}$ and adopting a normal basis representation of the field elements, the multiplier 48 may also provide the square of a number by cyclically shifting the elements one cell along the registers 42. After a one cell shift, the elements in the register represent the square of the number. In general, a number may be raised to the power $2^g$ by cyclically shifting g times through a register.

c) Inversion

Computation of the inverse of a number can be performed efficiently with the multiplier 48 by implementing an algorithm which utilises multiple squaring operations. The inverse $X^{-1}$ is represented as $X^{2^M-2}$ or $X^{2(2^{M-1}-1)}$.

If m-1 is considered as the product of two factors g,h then $X^{-1}$ may be written as $X^{2(2^{m-1}-1)}$ or $\beta^{2^{gh}-1}$ where $\beta=X^2$.

The exponent $2^{gh}-1$ is equivalent to $$(2^g - 1)\left(\sum_{i=0}^{h-1} 2^{ig}\right)$$

The term $2^g-1$ may be written as $$\sum_{j=0}^{g-1} 2^j$$

so that $$X^{-1} \equiv \beta^{\left(\sum_{j=0}^{g-1} 2^j\right)\left(\sum_{i=0}^{h-1} 2^{ig}\right)}$$

$$\beta^{\sum_{j=0}^{g-1} 2^j} \equiv \beta^{1+2+2^2+2^3 \ldots 2^{g-1}}$$

and is denoted $\gamma$

Figure 4:
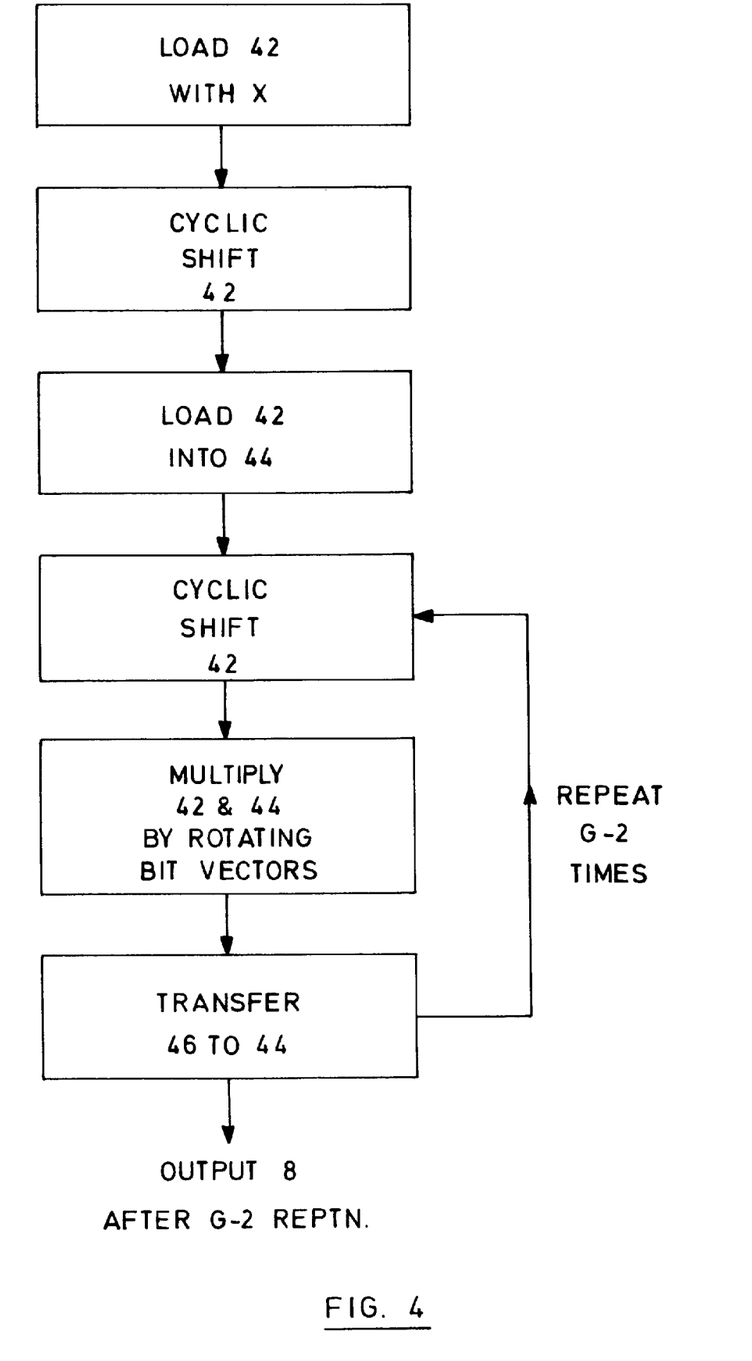
FIG. 4 is a flow chart showing movement of the elements through the processor of FIG. 3 in computing an inverse function.

This term may be computed on multiplier 48 as shown in FIG. 4 by initially loading registers 42, with the value X. This is shifted 1 cell to represent $\beta$ (i.e. $X^2$) and the result loaded into both registers 42, 44.

Register 44 is then shifted to provide $\beta^2$ and the registers 42, 44 multiplied to provide $\beta^{2+1}$ in the accumulating register 46. The multiplication is obtained with one motion, i.e. a m bit cyclic shift, of each of the registers 42, 44, 46.

The accumulated term $\beta^{1+2}$ is transferred to register 44 and register 42, which contains $\beta^2$ is shifted one place to provide $\beta^4$. The registers 42, 44 are multiplied to provide $\beta^{1+2+4}$.

This procedure is repeated g-2 times to obtain $\gamma$. As will be described below, $\gamma$ can be exponentiated in a similar manner to obtain $$\gamma^{\sum_{i=0}^{h-1} 2^{ig}} \quad \text{i.e. } x^{-1}$$

This term can be expressed as $\gamma^{1+2^g+2^{2g}+2^{3g} \ldots 2^{(m-1)g}}$.

As noted above, $\gamma$ can be exponentiated to the $2^g$ by shifting the normal basis representation g times in the register 42, or 44.

Accordingly, the registers 42, 44 are each loaded with the value $\gamma$ and the register 42 shifted g times to provide $\gamma^{2^g}$. The registers 42, 44 are multiplied to provide $\gamma \cdot \gamma^{2^g}$ or $\gamma^{1+2^g}$ in the accumulating register 46. This value is transferred to the register 44 and the register 42 shifted g times to provide $\gamma^{2^{2g}}$.

The multiplication will then provide $\gamma^{1+2^g+2^{2g}}$. Repetition of this procedure (h-1)g-1 times produces the inverse of X in the accumulating register 46.

From the above it will be seen that squaring, multiplying, and inverting can be effectively performed utilising the finite field multiplier 48.

Addition of Point P to Itself (P+P) Using the Subroutines

To compute the value of dP for generation of the public key, the arithmetic unit 20 associated with the receiver 12 initially computes the addition of P+P. As noted in the introduction, for a nonsupersingular curve the new point Q has coordinates $(X_3, Y_3)$ where $$X_3 = X_1^2 \oplus \frac{b}{X_1^2}$$

$$Y_3 = X_1^2 \oplus \left(X_1 \oplus \frac{Y_1}{X_1}\right) X_3 \oplus X_3$$

Figure 5:
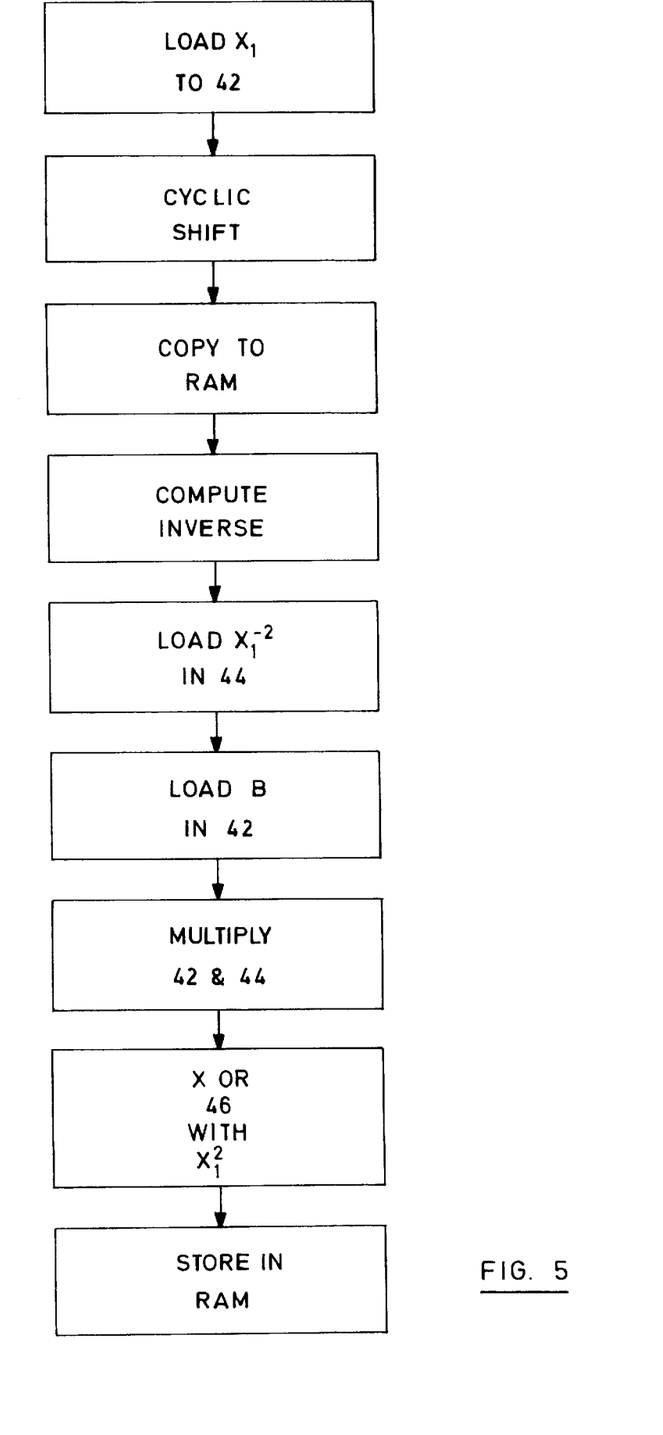
FIG. 5 is a flow chart showing movement of elements through the processor of FIG. 3 to compute the addition of two points.

To compute $X_3$, the following steps may be implemented as shown in FIG. 5.

The m bits representing $X_1$ are loaded into register 42 from base point register 28 and shifted one cell to the right to provide $X_1^2$. This value is stored in RAM 36 and the inverse of $X_1^2$ computed as described above.

The value of $X_1^{-2}$ is loaded into register 44 and the parameter b extracted from the parameter register 30 and loaded into register 42. The product $bx_1^{-2}$ is computed in the accumulating register 46 by rotating the bit vectors and the resultant value XOR'd in adder 52 with value of $X_1^2$ stored in RAM 36 to provide,the normal basis representation of $X_3$. The result may be stored in RAM 36.

A similar procedure can be followed to generate $Y_3$ by first inverting $X_1$, multiplying the result by Y, and XORing with $X_1$ in the adder 52. This is then multiplied by $X_3$ stored in RAM 36 and the result XOR'd with the value of $X_3$ and $X_1^2$ to produce $Y_3$.

The resultant value of $(X_3, Y_3)$ represents the sum of P+P and is a new point Q on the curve. This could then be added to P to produce a new point Q'. This process could be repeated d−2 times to generate dP.

The addition of P+Q requires the computation of $(X_3, Y_3)$ where $$x_3 = \left(\frac{y_1 \oplus y_2}{x_1 \oplus x_2}\right)^2 \oplus \frac{y_1 \oplus y_2}{x_1 \oplus x_2} \oplus x_1 \oplus x_2 \oplus a \text{ and}$$

$$y_3 = \left(\frac{y_1 \oplus y_2}{x_1 \oplus x_2}\right)(x_1 \oplus x_3) \oplus x_3 \oplus y_1.$$

This would be repeated d−2 times with a new value or Q at each iteration to compute dP.

Whilst in principal this is possible with the arithmetic unit 20, in practice the large numbers used make such a procedure infeasible. A more elegant approach is available using the binary representation of the integer d.

Computation of dP from 2P

To avoid adding dissimilar points P and Q, the binary representation of d is used with a doubling method to reduce the number of additions and the complexity of the additions.

The integer d can be expressed as $$d = \sum_{i=0} \lambda_j 2^i, \lambda_i \in (0, 1) \text{ and}$$

$$dP = \sum_{i=0} \lambda_i(2^i P) \text{ i.e. } \lambda_m 2^m P + \lambda_{m-1} 2^{m-1} P \ldots \lambda_3 2^3 P + \lambda_2 2^2 P + \lambda_1 2P + \lambda_0 P$$

The values of λ are the binary representation of d.

Having computed 2P, the value obtained may be added to itself, as described above at FIG. 5 to obtain $2^2P$, which in turn can be added itself to provide $2^3P$ etc. This is repeated until $2^iP$ is obtained.

At each iteration, the value of $2^iP$ is retained in RAM 36 for use in subsequent additions to obtain dp.

The arithmetic unit 20 performs a further set of additions for dissimilar points for those terms where λ is 1 to provide the resultant value of the point $(x_3,y_3)$ representing dP.

If for example k=5, this can be computed as $2^2P+P$ or 2P+2P+P or Q+Q+P. Therefore the result can be obtained in 3 additions; 2P=Q takes 1 addition', 2P+2P=Q+Q=R takes 1 and R+P takes 1 addition. At most t doublings and t subsequent additions are required depending on how many λ are 1.

Performance of Arithmetic Units 20

For computations in a Galois field $F_{2^{155}}$ it has been found that computing the inverse takes approximately 3800 clock cycles.

The doubling of a point, i.e. the addition of point to itself, takes in the order of 4500 clock cycles and for a practical implementation of a private key, the computation of the public key dP may be computed in the order of $1.5 \times 10^5$ clock cycles. With a clock rate typically in the order of 40 mHz, the computation of dP will take in the order of $3 \times 10^{-2}$ seconds. This throughput can be enhanced by bounding the seed key k with a Hamming weight of, for example, 20 and thereby limit the number of additions of dissimilar points.

Computation of Session Public Key kP and Encryption Key kdP

The session public key kP can similarly be computed with the arithmetic unit 20 of transmitter 10 using the base point P from register 28. Likewise, because the public key dP is represented as a point,$(x_3,y_3)$, the encryption key kdP can be computed in similar fashion.

Each of these operations will take a similar time and can be completed prior to the transmission.

The recipient 12 is similarly required to compute dkP as he received the ciphertext c which again will take in the order of $3 \times 10^{-2}$ seconds, well within the time expected for a practical implementation of an encryption unit.

The public key dP, and the session key kP are each represented as a 310 bit data string and as such require a significantly reduced bandwidth for transmission. At the same time, the attributes of elliptic curves provides a secure encryption strategy with a practical implementation due to the efficacy of the arithmetic unit 20.

Curve Selection a) The selection of the field $F_{q^m}$

The above example has utilised a field of $2^{155}$ and a non-supersingular curve. The value 155 was chosen in part because an optimal normal basis exists in $F_{2^{155}}$ over $F_2$. However, a main consideration is the security and efficiency of the encryption system. The value 155 is large enough to be secure but small enough for efficient operation. A consideration of conventional attacks that might be used to break the ciphertext suggests that with elliptic curves over $F_{2^m}$, a value of m of about 130 provides a very secure system. Using one thousand devices in parallel, the time taken to find one logarithm is about $1.5 \times 10^{11}$ seconds or at least 1500 years using the best known method and the field $P_{2^{155}}$. Other techniques produce longer run times.

b) Supersingular v. Nonsupersingular Curves

A comparison of attacks on data encrypted using elliptic curves suggests that non-supersingular curves are more robust than supersingular curves. For a field $F_{q^k}$, an attack based on the method suggested by Menezes, Okamoto and Vanstone in an article entitled "Reducing elliptic curve logarithms to logarithms in finite field" published in the Proceeding 22 Annual ACM Symposium Theory Computing 1991, pp. 80–89, (The MOV attack) shows that for small values of k, the attack becomes subexponential. Most supersingular curves have small values of k associated with them. In general however, non-supersingular curves have large values of k and provided k>$\log^2$q then the MOV attack becomes less efficient than more conventional general attacks.

The use of a supersingular curve is attractive since the doubling of a point (i.e. the case where P=Q) does not require any real time inversions in the underlying field. For a supersingular curve, the coordinates of 2P are $$x_3 = \frac{x_1^4 \oplus b^2}{a^2} \text{ and } y_3 = \left(\frac{x_1^2 \oplus b}{a}\right)(x_1 \oplus x_3) \oplus y_1 \oplus a.$$

Since a is a constant, $a^{-1}$ and $a^{-2}$ is fixed for a given curve and can be precomputed. The values of $x_1^2$ and $x_1^4$ can be computed with a single and double cyclic shift respectively on the multiplier 48. However, the subsequent addition of dissimilar points to provide the value of dP still requires the computation of an inverse as $$x_3 = \left(\frac{y_1 \oplus y_2}{x_1 \oplus x_2}\right)^2 \oplus x_1 \oplus x_2$$

and $$y_3 = \left\{\left(\frac{y_1 \oplus y_2}{x_1 \oplus x_2}\right)(x_1 \oplus x_3) \oplus y_1 \oplus a\right.$$

Accordingly, although supersingular curves lead to efficient implementations, there is a relatively small set of supersingular curves from which to choose, particularly if the encryption is to be robust. For a supersingular curve where m is odd, there are 3 classes of curve that can be considered further, namely $y^2+y=x^3$ $y^2+y=x^3+x$ $y^2+y=x^3+x+1$ However, a consideration of these curves for the case where m=155 shows that none provide the necessary robustness from attack.

Enhanced security for supersingular curves can be obtained by employing quadratic extensions of the underlying field. In fact, in $F_q$ where $q=2^{310}$, i.e. a quadratic extension of $F_{2^{155}}$, amongst the supersingular curves, there are four which under the MOV attack require computation of discrete logs in $F_{2^{930}}$. These curves provide the requisite high security and also exhibit a high throughput. Similarly, in other extensions of subfields of $F_{155}$ (e.g. $F_{2^{31}}$) other curves exist that exhibit the requisite robustness. However, their use increases the digits that define a point and hence the bandwidth when they are transmitted.

By contrast, the number of nonsupersingular curves of $F_q$, $q=2^{155}$, is $2(2^{155}-1)$. By selecting q=2 i.e. a field $F_{2^M}$, the value of a in the representation of the curve, $y^2+xy=x^3+ax^2+b$, can be chosen to be either 1 or 0 without loss of generality. This large choice of curves permits large numbers of curves over this field to be found for which the order of a curve is divisible by a large prime factor. In general, determining the order of an arbitrary nonsupersingular curve over $F_q$ is not trivial and one approach is explained further in a paper entitled "Counting Points on Elliptic Curves" by Menezes, Vanstone and Zuccherato, Mathematics of Computation 1992.

In general however, the selection of suitable curves is well known in the art, as exemplified in "Application of Finite Fields", chapters 7 and 8, by Menezes, Blake et al, Kluwer Academic Publishers (ISBN 0-7923-9282-5). Because of the large numbers of such curves that meet the requirements, the use of nonsupersingular curves is preferred despite the added computations.

An alternative approach that reduces the number of inversions when using nonsupersingular curves is to employ homogeneous coordinates. A point P is defined by the coordinates (x,y,z,) and Q by the point $(x_2,y_2,x_2)$ The point (0, 1, 0) represents the identity O in E.

To derive the addition formulas for the elliptic curve with this representation, we take points $P=(x_1,y_1,z_1)$ and $Q=(x_2,y_2,z_2)$, normalize each to $(x_1/z_1, y_1/z_1, 1)$, $(x_1/z_1, y_2/z_2, 1)$, and apply the previous addition formulas. If $P=(x_1,y_1,z_1)$, $Q=(x_2,y_2,z_2)$, $P,Q \neq O$, and $P \neq -Q$ then $P+Q=(x_3,y_3,z_3)$ where if $P \neq Q$, then $x_3=AD$ $y_3=CD+A^2(Bx_1+Ay_1)$ $z_3=A^3z_1z_2$ where $A=x_2z_1+x_1z_2$, $B=y_2z_1+y_1z_2$, $C=A$ 30 B and $D=A^2(A+az_1z_2)+z_1z_2BC$.

In the case of P=Q, then $x_3=AB$ $y_3=x_1^4A+B(x_1^2+y_1z_1+A)$ $z_3=A^3$ where $A=x_1z_1$ and $B=bz_1^4+x_1^4$.

It will be noted that the computation of $x_3$ $y_3$ and $z_3$ does not require any inversion. However, to derive the coordinates $x_3^m$, $y_3^m$ in a nonhomogeneous representation, it is necessary to normalize the representation so that $x_3^m=x_3/z_3$ $y_3^m=y_3/z_3$ This operation requires an inversion that utilizes the procedure noted above. However, only one inversion operation is required for the computation of dP.

Using homogeneous coordinates, it is still possible to compute dP using the version of the double and add method described above. The computing action of P+Q , $P \neq Q$, requires 13 field multiplications, and 2P requires 7 multiplications.

Alternative Key Transfer

In the example above, the coordinates of the keys kP kdP are each transferred as two 155 bit field elements for $F_{2^{155}}$. To reduce the bandwidth further it is possible to transmit only one of the co-ordinates and compute the other coordinate at the receiver. An identifier, for example a single bit of the correct value of the other coordinate, may also be transmitted. This permits the possibilities for the second coordinate to be computed by the recipient and the correct one identified from the identifier.

Referring therefore to FIG. 1, the transmitter 10 initially retrieves as the public key dP of the receiver 12, a bit string representing the coordinate $x_0$ and a single bit of the coordinate $y_0$.

The transmitter 10 has the parameters of the curve in register 30 and therefore may use the coordinate $x_0$ and the curve parameters to obtain possible values of the other coordinate $y_0$ from the arithmetic unit 20.

For a curve of the form $y^2+xy=x^3+ax^2+b$ and a coordinate $x_0$, then the possible values $y_1,y_2$ for $y_0$ are the roots of the quadratic $y^2+x_0y=x_0^3+ax_0^2+b$.

By solving for y, in the arithmetic unit 20 two possible roots will be obtained and comparison with the transmitted bit of information will indicate which of the values is the appropriate value of y.

The two possible values of the second coordinate $(y_0)$ differ by $x_0$, i.e. $y_1=y_2+x_0$.

Since the two values of $y_0$ differ by $x_0$, then $y_1$ and $y_2$ will always differ where a "1" occurs in the representation of $x_0$. Accordingly the additional bit transmitted is selected from one of those positions and examination of the corresponding bit of values of $y_0$, will indicate which of the two roots is the appropriate value.

The receiver 10 thus can generate the coordinates of the public key dP even though only 156 bits are retrieved.

Similar efficiencies may be realized in transmitting the session key kP to the receiver 12 as the transmitter 10s need only forward one coordinate, $x_0$ and the selected identifying bit of $y_0$. The receiver 12 may then reconstruct the possible values of $y_0$ and select the appropriate one.

In the field $F_{2^m}$ it is not possible to solve for y using the quadratic formula as $_2a=0$. Accordingly, other techniques need to be utilised and the arithmetic unit 20 is particularly adapted to perform this efficiently.

In general provided $X_0$ is not zero, if $y=x_0z$ then $x_0^2z^2+x_0^2z=x^3_0+ax_0^2+b$.

This may be written as $$z^2 + z = x_0 + a + \frac{b}{x_0^2} = c.$$

i.e. $z^2+z=c$.

If m is odd then either $$z = c + c^4 + c^{16} \ldots + \ldots + c^{2^{m-1}}$$
$$= c^{2^0} + c^{2^2} + c^{2^4} + \ldots + c^{2^8} + c^{2^{m-1}}$$

or $z=1+c^{2^o}+ \ldots +c^{2^{m-1}}$ to provide two possible values for $y_0$.

A similar solution exists for the case where m is even that also utilises terms of the form $c^{2^g}$.

This is particularly suitable for use with a normal basis representation in $F_{2^m}$.

As noted above, raising a field element in $F_{2^m}$ to a power g can be achieved by a g fold cyclic shift where the field element is represented as a normal basis.

Accordingly, each value of z can be computed by shifting and adding and the values of $y_0$ obtained. The correct one of the values is determined by the additional bit transmitted.

The use of a normal basis representation in $F_{2^m}$ therefore simplifies the protocol used to recover the coordinate $y_0$.

If $P=(x_0\ y_0)$ is a point on the elliptic curve $E:y^2+xy=x^3+ax^2+b$ defined over a field $F_{2^m}$, then $y_0$ is defined to be 0 if $x_0=0$; if $x_0 \neq 0$ then $y_0$ is defined to be the least significant bit of the field element $y_0 \cdot x_0^{-1}$.

The x-coordinate $x_0$ of P and the bit $y_0$ are transmitted between the transmitter 10 and receiver 12. Then the y coordinate $y_0$ can be recovered as follows.

1. If $x_0=0$ then $y_0$ is obtained by cyclically shifting the vector representation of the field element b that is stored in parameter register 30 one position to the left. That is, if $b=b_{m-1}b_{m-2} \ldots b_1b_0$ then $y_0=b_{m-2} \ldots b_1b_0b_{m-1}$ 2. If $x_0 \neq 0$ then do the following:

2.1 Compute the field element $c=x_0+a+bx_0^{-2}$ in $F_2^m$.

2.2 Let the vector representation of c be $c=c_{m-1}\ c_{m-2} \cdot \ldots c_1c_0$.

2.3 Construct a field element $z=z_{m-1}z_{m-2} \ldots z_1z_0$ by setting $z_0 = \hat{y}_0,$ $z_1 = c_0 \oplus z_0,$ $z_2 = c_1 \oplus z_1,$ $\vdots$ $z_{m-2} = c_{m-3} \oplus z_{m-3},$ $z_{m-1} = c_{m-2} \oplus z_{m-2}.$ 2.4 Finally, compute $y_0=x_0 \cdot z$.

It will be noted that the computation of $x_0^{-1}$ can be readily computed in the arithmetic unit 20 as described above and that the computation of $y_0$ can be obtained from the multiplier 48.

In the above examples, the identification of the appropriate value of $y_0$ has been obtained by transmission of a single bit and a comparison of the values of the roots obtained. However, other indicators may be used to identify the appropriate one of the values and the operation is not restricted to encryption with elliptic curves in the field $GF(2^m)$. For example, if the field is selected as Zp p=3(mod 4) then the Legendre symbol associated with the appropriate value could be transmitted to designate the appropriate value. Alternatively, the set of elements in Zp could be subdivided into a pair of subsets with the property that if y is in one subset, then $-y$ is in the other, provided $y \neq 0$. An arbitrary value can then be assigned to respective subsets and transmitted with the coordinate $x_0$ to indicate in which subset the appropriate value of $y_0$ is located. Accordingly, the appropriate value of $y_0$ can be determined. Conveniently, it is possible to take an appropriate representation in which the subsets are arranged as intervals to facilitate the identification of the appropriate value of $y_0$.

These techniques are particularly suitable for encryption utilizing elliptic curves but may also be used with any algebraic curves and have applications in other fields such as error correcting coding where coordinates of points on curves have to be transferred.

It will be seen therefore that by utilising an elliptic curve lying in the finite field $GF_2^m$ and utilising a normal basis representation, the computations necessary for encryption with elliptic curves may be efficiently performed. Such operations may be implemented in either software or hardware and the structuring of the computations makes the use of a finite field multiplier implemented in hardware particularly efficient.

I claim:

1. In a data encryption system in which the data is combined with an encryption key to produce ciphertext, a method of generating a key comprising the steps of a) selecting an elliptic curve of the form $y^2+xy=x^3+ax^2+b$ lying in the finite field $GF2^m$, said field being selected to have elements $A^{2^i}$ ($o \leq i \leq m$) that constitute a normal basis, b) representing the coordinates of a point on said curve as a set of vectors, each vector representing a coordinate of said point and having m binary digits, each of which represents the coefficient of $A^{2^i}$ in the normal basis representation of said vector, c) computing from addition of at least two sets of vectors an additional set of vectors to represent the coordinates of further point on said curve, and d) utilising said additional set of vectors to derive a key for encrypting data.

2. A method according to claim 1 wherein addition of sets of vectors involves at lest one squaring operation.

3. A method according to claim 2 wherein said squaring operation is performed on at least one of said vectors of one of said sets representing a point.

4. A method according to claim 3 wherein said squaring operation is performed on combinations of vectors from a plurality of said sets representing respective points.

5. A method according to claim 3 wherein each of said vectors is represented as m binary digits and squaring thereof is performed by a cyclic shift of said m binary digits.

6. A method according to claim 5 wherein said m binary digits are stored in respective cells of a shift register and squaring thereof is performed by a cyclic shift of said m bits in said register.

7. A method according to claim 1 wherein addition of sets of vectors involves the computation of at least one inverse of a vector.

8. A method according to claim 7 wherein said inversion utilises multiple squaring operations.

9. A method according to claim 8 wherein squaring operations are performed by a cyclic shift of binary digits.

10. A method according to claim 7 wherein computation of said inverse includes an exponentiation of the square of the vector to provide a value $\gamma$ of the form $$\gamma = \beta^{1+2+2^2 \ldots 2^{g-1}}$$

where $\beta$ is the square of the vector and g is a factor of m−1.

11. A method according to claim 10 wherein successive terms of said exponentiation are obtained by successive cyclic shifts of the vector.

12. A method according to claim 11 wherein the value of the $\gamma$ is accumulated after each cyclic shift by multiplication of the shifted term with the previously accumulated value of $\gamma$.

13. A method according to claim 10 wherein m binary digits representing $\beta$ are stored in each of a pair of shift registers, one of said pair of registers being cyclically shifted and said pair of registers being multiplied to provide an intermediate value of $\gamma$.

14. A method according to claim 13 wherein said one of said pair of registers is further cyclically shifted to provide a further successive term of said expansion and said further successive term multiplied with said intermediate value to provide a further intermediate value of $\gamma$.

15. A method according to claim 14 wherein said cyclic shifting and multiplication is performed g−2 times to complete said exponentiation of $\beta$ and provide a value of $\gamma$.

16. A method according to claim 10 where computation of said inverse includes a further exponentiation of $\gamma$ of the form $$\gamma^{1+2^g+2^{2g} \ldots 2^{(h-i)g}}$$

where h is a factor of m−1 such that gh=m−1.

17. A method according to claim 16 wherein successive terms said further exponentiation are obtained by successive cyclic shifts of the m binary digits representing $\gamma$.

18. A method according to claim 17 wherein the value of said inverse is accumulated after each cyclic shift by multiplication of the shifted term with the previously accumulated value of $\gamma$.

19. A method according to claim 16 wherein m binary digits representing $\gamma$ are stored in each of a pair of shift registers, one of said pair of registers being cyclically shifted and said pair of registers being multiplied together to provide an intermediate value of said inverse.

20. A method according to claim 19 wherein said one of said pair of registers is further cyclically shifted to provide a further successive term of said expansion which is then multiplied with said intermediate value of said inverse to provide a further intermediate value thereof.

21. A method according to claim 20 wherein said cyclic shifting and multiplication is performed (h−1)g−1 times to complete exponentiation of $\gamma$.

22. A method according to claim 11 wherein said further point on said curve is an integer multiple d of said point P and said value dP is computed by successively doubling multiples of P to provide terms $2^t P$ from t=o to t=m, and computing $$\sum_{i=0} \lambda_i (2^i P)$$

where $\lambda$ is the coefficient of the binary representation of d.

23. A method according to claim 22 wherein doubling of multiples of p is obtained by computing $$X_3 = X_1^2 \oplus \frac{b}{X_1^2}$$

and $$Y_3 = X_1^2 \oplus \left( X_1 \oplus \frac{Y_1}{X_1} \right) X_3 \oplus X_3$$

where $x_1 y_1$ are the coordinates of the point $2^{i-1}$ and $x_3 y_3$ are the coordinates of the point $2^i p$.

24. A method according to claim 23 wherein computation of the term $x_1^2$ is obtained by a cyclic shift of binary digits representing $x_1$ in a normal basis.

25. A method according to claim 24 wherein computation of the inverse of $x_1^2$ is computed by an exponentiation of $x_1^2$ to provide a value $\gamma$ of the form $$\beta^{1+2+2^2 \ldots 2^{g-1}}$$

where $\beta = x_1^2$ and g is a factor of m−1.

26. A method according to claim 25 wherein successive terms of said exponentiation are obtained by successive cyclic shifts of the binary digits representing $x_1^2$ in a normal basis.

27. A method according to claim 26 wherein computation of the inverse of $x_1^2$ includes a further exponentiation of $\gamma$ of the form $$\gamma \Sigma 1+2^g+2^{2g} \ldots 2^{(h-i)g}$$

where h is a factor of m−1 such that gh=m−1.

28. A method according to claim 27 wherein successive terms said further exponentiation are obtained by successive cyclic shifts of the m binary digits representing $\gamma$.

29. A method of transferring the coordinates of a point on an algebraic curve defined by a function of two variables between a pair of correspondents connected by a data communications link comprising the steps of forwarding from one correspondent to another a coordinate of said point, providing at said other correspondent parameters of said algebraic curve, and computing at said other correspondent said other coordinate from said one coordinate and said algebraic curve.

30. A method according to claim 29 including the step of forwarding with said one coordinate identifying information of said other coordinate and utilising said identifying information and a discriminating function to determine the appropriate value of said other coordinate.

31. A method according to claim 30 wherein said identifying information is a digital bit of said other coordinate that identifies the appropriate value of said other coordinate.

32. A method according to claim 30 wherein said algebraic curve is an elliptic curve of the form $y^2 + xy = x^3 + ax^2 + b$ and said other coordinate is determined by solving a quadratic equation to provide two possible values of said other coordinate, said identifying information indicating the appropriate one of said values.

33. A method according to claim 32 wherein said identifying information is a digital bit of said other coordinate that identifies the appropriate value of said other coordinate.

34. A method according to claim 30 wherein said algebraic curve is defined over the field Zp and said identifying information indicates the Legendre symbol of the appropriate value.

35. A method according to claim 30 wherein said curve is defined over the field zp and the elements thereof subdivided into a pair of subsets, one of which contains one possible value and the other of which contains the other possible value, said indicating information identifying the subset containing the appropriate value.

36. A method according to claim 29 wherein said algebraic curve is an elliptic curve of the form $y^2+xy=x^3+ax+b$ defined over a finite field $F_2^m$.

37. A method according to claim 36 including the step of forwarding with said one coordinate identifying information of said other coordinate and utilising said identifying information and a discriminating function to determine the appropriate value of said other coordinate.

38. A method according to claim 37 wherein said field $GF2^m$ has field elements $A^{2^i}$ that constitute a normal basis.

39. A method according to claim 38 wherein said other coordinate is determined by solving a quadratic equation to provide two possible values of said other coordinate, said identifying information indicating the appropriate one of said values.

40. A method according to claim 38 wherein said quadratic equation is solved by summing terms of the form c from g=0 to g=m−1 where $$c = X_0 + a + \frac{b}{X_0^2}$$

and $x_0$ is said one coordinate.

41. A method according to claim 40 wherein terms of the form c are obtained by g fold cyclic shifts of the normal basis representation of c.

42. A method of encrypting a message m using a public key cryptographic system and having a private key formed from a bit string representative of a coordinate (x, y) of a point p on an elliptic curve, said method comprising the steps of representing said message m as a pair of message bit strings $m_1 m_2$ of length corresponding to the bit strings representing the coordinates x,y, and combining said message bit strings with an enciphering bit string derived from at least one of said coordinates to generate a ciphertext c of said message.

43. A method according to claim 42 wherein said enciphering bit strings are derived from each of said coordinates to produce ciphertext c.

44. A method according to claim 42 wherein said message bit strings are combined with enciphering bit strings derived from one of said coordinates and a function thereof to produce said ciphertext.

45. A method according to claim 43 wherein said enciphering bit string is derived from said coordinate x and the cube $x^3$ thereof.

46. A method according to claim 42 wherein field elements z are derived from at least one of said coordinates and modify the combination of said message bit strings and said enciphering bit string.

47. A method according to claim 46 wherein said ciphertext c is of the form $(c_1 c_2)$ where $c_1 = z_1(m_1 \oplus f_1(x_0))$ and $c_2 + z_2(m_1 \oplus f_2(x_0))$;

$f_1(x_0) f_2(x)$ are respective first and second values derived from the coordinate x and $z_1$ and $z_2$ are respective field elements derived from the coordinate x.

48. A method according to claim 47 wherein $f_2(x)$ is said second coordinate y.

49. A method according to claim 47 wherein $f_2(x)$ is the cube of the value of the coordinate x.

50. A method according to claim 47 wherein said field elements z are formed by concatenating part of each of said values $f_1(x)$, $f_2(x)$.

51. A method according to claim 50 wherein $f_2(x)$ is derived from the cube of the value of the coordinate x.

52. A method according to claim 47 wherein $c_1 = z_1(m_1 \oplus x_0)$ and $c_2 = z_2(m_2 \oplus x_0^3)$ and $z_1 = x_{01} \| x_2^3$ and $z_2 = x_2 \| x_1^3$ where $x_1 \| x_2^3$ is the counterclaim of the first half of the representation of the coordinate x and the second half of the cancellation of the representation of $x^3$ and $x_2 \| x_1^3$ is the concatenation of the second half of the representation of the coordinate x with the first half of the representation of the $X^3$.

* * * * *